Dec. 6, 1960            K. C. KARDE            2,963,006
TWO CYCLE SUPER CHARGED INTERNAL COMBUSTION ENGINE
Filed July 12, 1957            5 Sheets-Sheet 2
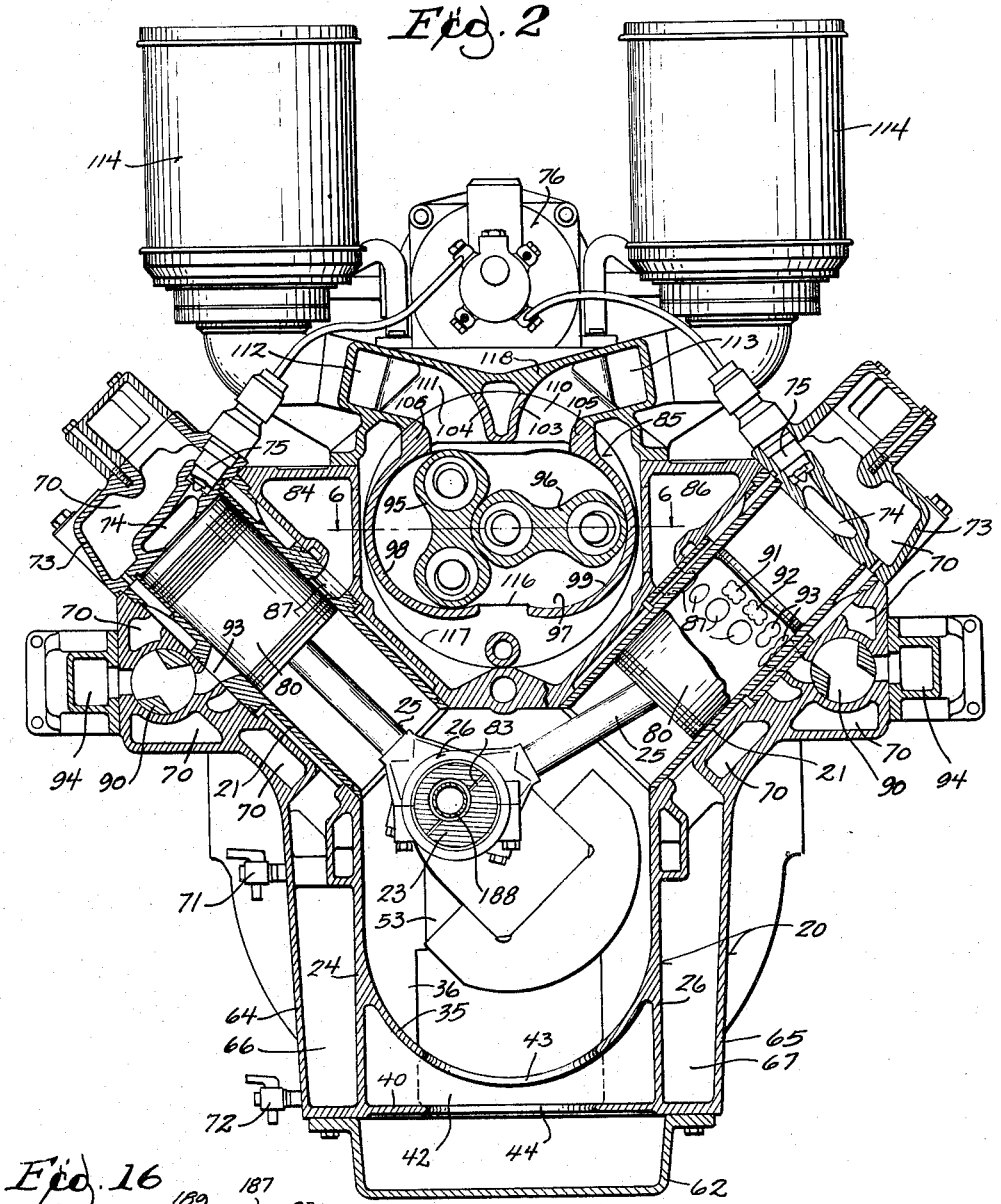
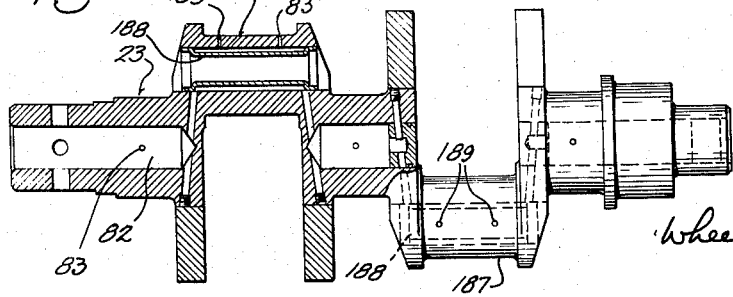
INVENTOR.
KLAUS C. KARDE
Wheeler, Wheeler & Wheeler
ATTORNEYS Dec. 6, 1960          K. C. KARDE          2,963,006
TWO CYCLE SUPER CHARGED INTERNAL COMBUSTION ENGINE
Filed July 12, 1957          5 Sheets-Sheet 3
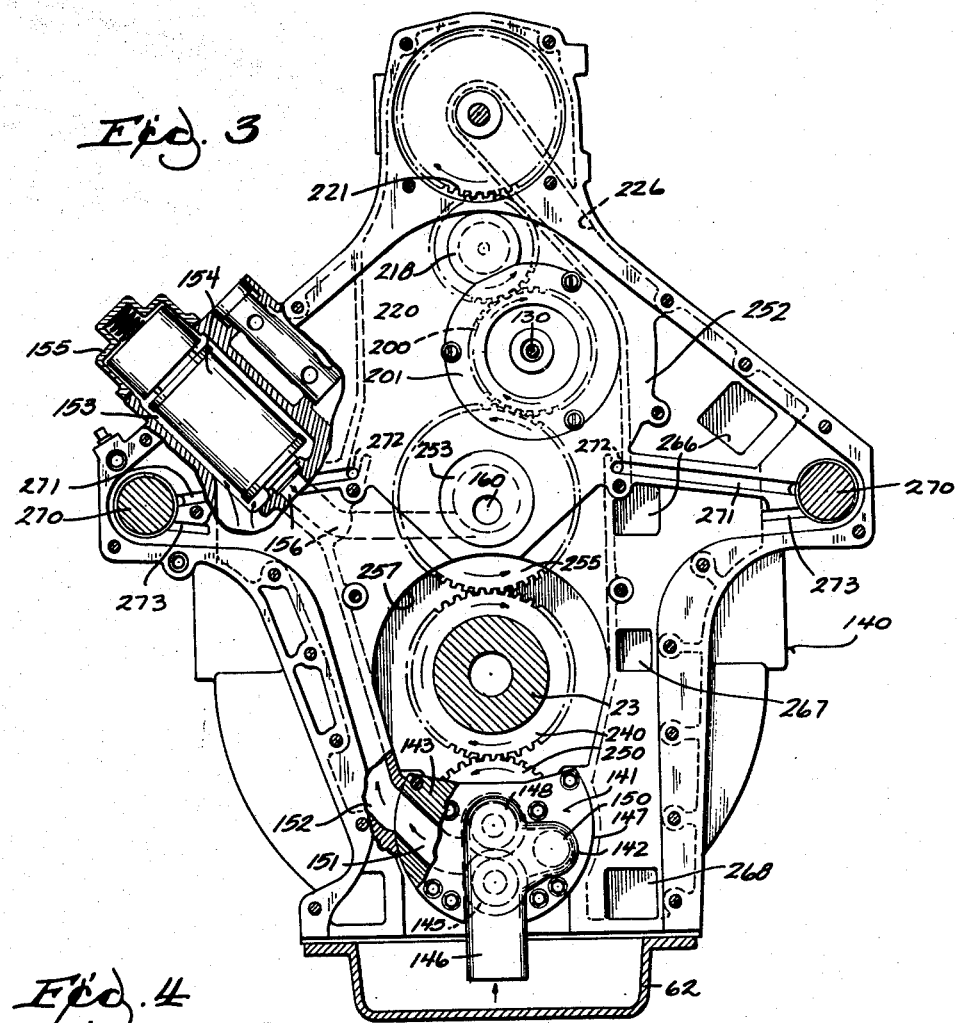
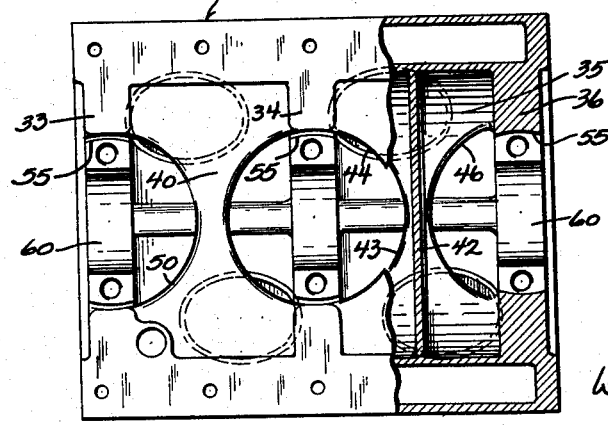
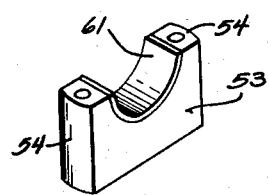
INVENTOR.
KLAUS C. KARDE
BY
Wheeler, Wheeler + Wheeler
ATTORNEYS INVENTOR.
KLAUS C. KARDE
BY
Wheeler, Wheeler & Wheeler
ATTORNEYS

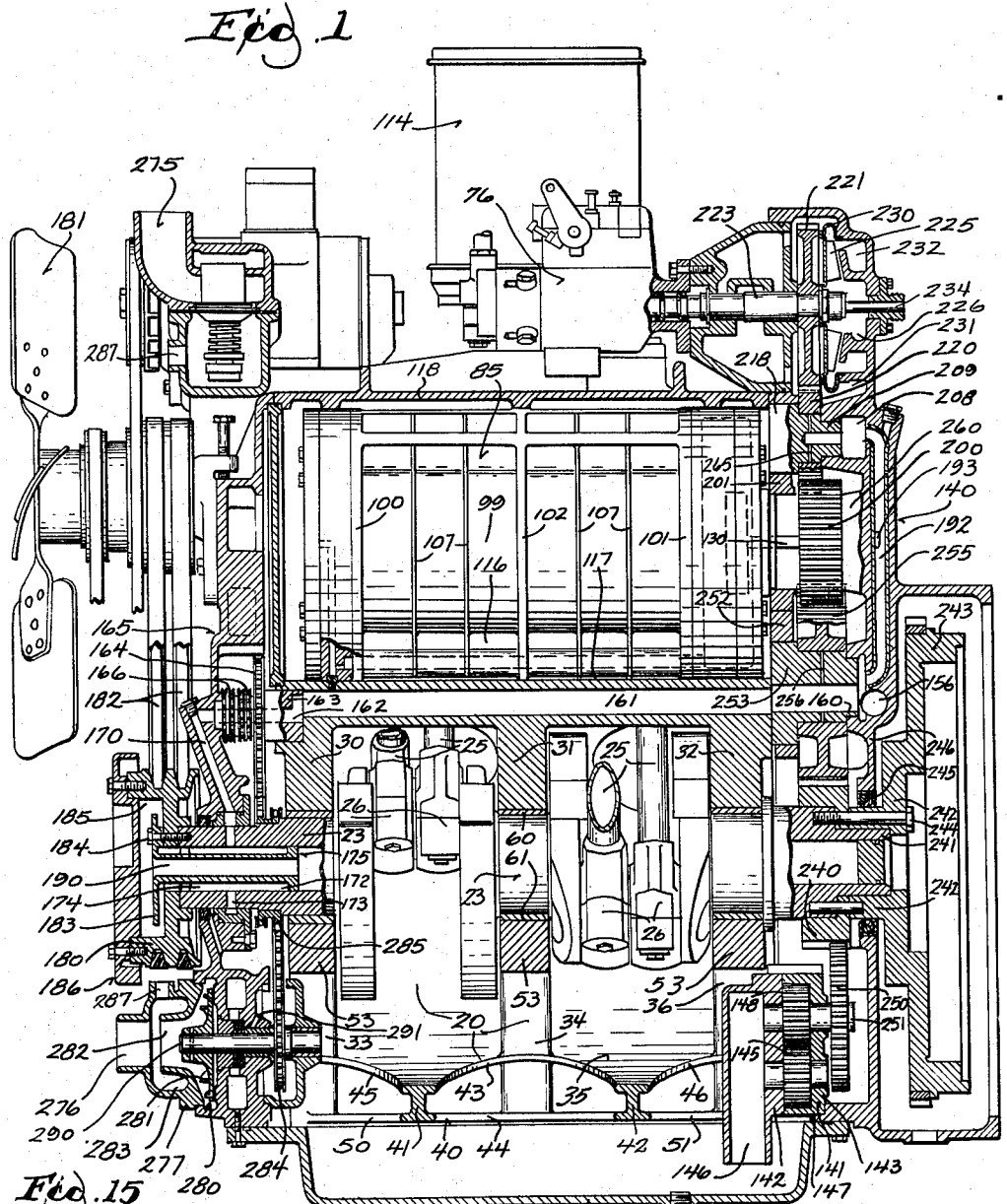

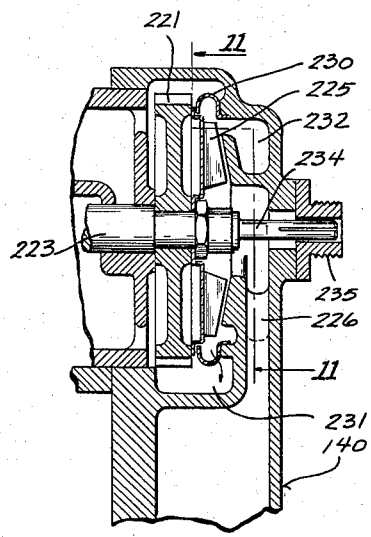
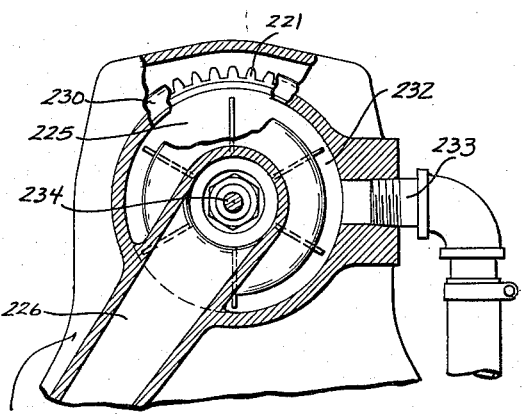
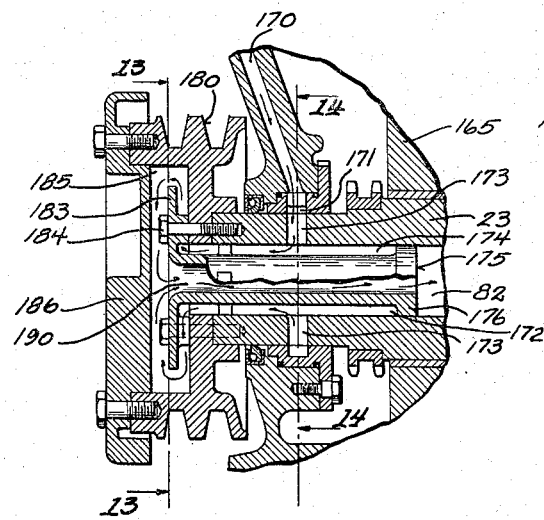
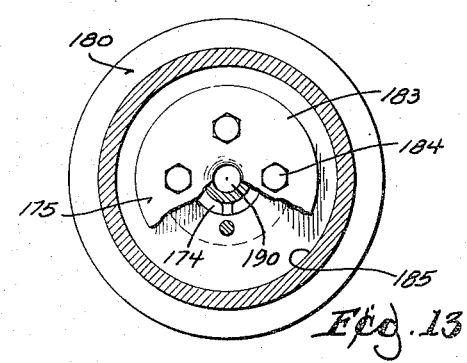
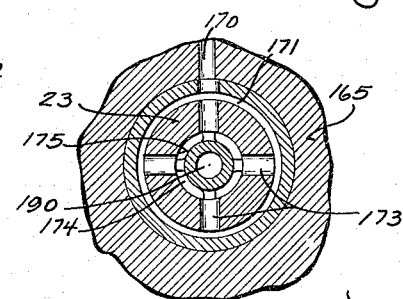

United States Patent Office 2,963,006
Patented Dec. 6, 1960

2,963,006

TWO CYCLE SUPER CHARGED INTERNAL COMBUSTION ENGINE

Klaus Christian Karde, Crystal Lake, Ill., assignor to Harnischfeger Corporation, Milwaukee, Wis., a corporation of Wisconsin Filed July 12, 1957, Ser. No. 671,453

20 Claims. (Cl. 123—41.33)

This invention relates to a two cycle super charged internal combustion engine desirably operating on the diesel principle.

While the engine disclosed has been designed specifically for diesel operation, many of the features herein disclosed have utility in other types of internal combustion engines. The preferred construction is one in which two rows of cylinders in a broad V arrangement are cast with the crankcase in a single block arrangement. In an exemplification, there are four cylinders, the cylinders of one row being slightly offset axially of the crankshaft from the cylinders of the other row, and the angle between them being 90°.

The invention involves a crankcase construction and shaft mounting which is especially useful in diesel practice but may find utility elsewhere. Except for a removable pan, the crankcase is integral with the cylinder block and is jacketed to a level well below the arc of the cranks and, moreover, has reinforcing webs which are both diametrical and cylindrical and are so apertured as to facilitate ready installation and removal of crankshaft and connecting rod bearings, connecting rods and pistons, while at the same time providing strength heretofore lacking and long sought in diesel engines of this type.

To reduce cost of manufacture, both the blower and oil pump, neither of which is normally cylindrical in its external contour, are so designed with external bosses or flanges of over-all cylindrical form that each will fit into a hole of circular cross section cored and/or machined in the cylinder and crankcase casting above referred to. Such a hole, as well as the complementary external contours of the oil pump and blower units, can very easily be machined or ground to a close fit at relatively low expense, and assembly and replacement are greatly simplified by this construction.

The problem of inserting the crankshaft into a Y-shaped casting integrally including the cylinder blocks and crankcase is solved by the provision of large crankshaft bearing supports or caps, those providing the terminal bearings constituting, in effect, end wall sections of the crankcase. These caps can be inserted and removed through the openings in the reinforcing webs above referred to. Before they are in place, the openings in the crankcase end walls are sufficiently large to permit the cranks to be manipulated through them. To facilitate the accurate positioning of these inserts in supporting relation to the bearings of the crankshaft, the inserts have side margins which are arcuate in plan and may conform to segments of a cylinder, the cylinder block casting having receiving sockets which likewise conform to segments of a cylinder and consequently are very easily machined or ground to the desired size and shape.

Many of the parts driven from the crankshaft are actuated by driving connections which, in practice, comprise gears, all mounted in a hollow supplemental wall applied to the rear of the cylinder block casting. The driving connections between the cylinder block casting and the outside of this hollow wall include gears for driving the oil pump, the blower, the fuel pump, and a centrifugal separator incorporated in the breather passage for returning to the crankcase oil entrained in gases escaping to the atmosphere.

Another feature of the invention is an oil cleaner. Oil from the oil pump at the rear of the block is conveyed by passage in the angle between the cylinders to the front of the block and is thence led to a centrifugal separator mounted on the forward end of the crankshaft in a chamber having peripheral clearance to receive centrifugally separated impurities, the purified oil passing axially into a passage which carries it through the crankshaft to lubricate the main bearings and connecting rod bearings.

Driven from the crankshaft at the front end of the engine are the fan and generator, the exhaust valve and a water pump of unusual design which centrally receives water from the radiator (not shown) and distributes it tangentially to passages at opposite sides of the crankcase and continuing up about the respective cylinder banks. Since the entire crankcase is water jacketed with the exception of the shallow pan at its bottom, the coolant maintains the oil at the temperature of the engine in general, facilitating warm-up in cold weather and eliminating excessive crankcase heat under load.

In the drawings:

Fig. 1 is a view in axial section through an engine embodying the invention.

Fig. 2 is a view in transverse section in which cylinders in the right hand and left hand bank are shown for convenience of illustration as if they were in the same plane, it being understood that in actual practice they are offset by the width of their respective connecting rod bearings.

Fig. 3 is a view generally in front elevation of the auxiliary housing applied to the rear of the cylinder block to mount the gear trains above referred to and the oil filter, portions being broken away to show in section some details of the structure.

Fig. 4 is a bottom plan view of the cylinder block, portions thereof being broken away to show the interior construction.

Fig. 5 is a detail view in perspective of one of the crankshaft bearing caps.

Fig. 10 is a fragmentary sectional view in the plane of Fig. 1 but showing on an enlarged scale the oil separator in the crankcase vent line.

Fig. 11 is a view principally in section on the line 11—11 of Fig. 10.

Fig. 12 is an enlarged detail view principally in the plane of Fig. 1 and fragmentarily illustrating the oil cleaner at the front of the crankshaft.

Fig. 13 is a view principally taken in section on the line 13—13 of Fig. 12, portions being broken away.

Fig. 14 is a view taken in section on the line 14—14 of Fig. 12.

Fig. 15 is a view partially in front elevation showing detail of the water pump, portions of the water pump housing being broken away.

Fig. 16 is a fragmentary view of a portion of the crankshaft in axial section.

Figure 6:
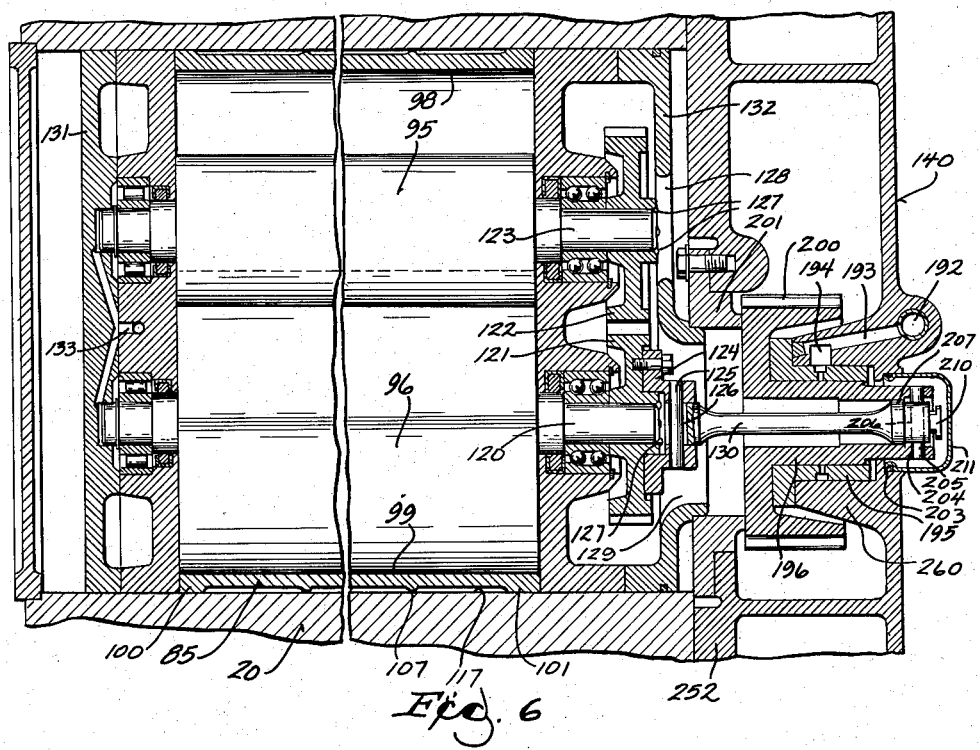
Fig. 6 is a greatly enlarged detail view on the line 6—6 of Fig. 2 through the driving axis of the blower and the means for effecting the drive thereto from the gear train.

The block desirably comprises in one casting provision for the crankcase 20 as well as for the cylinders, the latter desirably comprising liners as shown at 21 in Fig. 2. The specific embodiment disclosed has four cylinders set in banks of two at 90° to each other. The cylinders of the respective banks are not directly opposite but are offset axially of the crankshaft 23 to the extent indicated in Fig. 4, the offset being just sufficient to accommodate the attachment of the respective connecting rods 25 to the cranks by means of the usual connecting rod bearings 26.

In such an engine, it has always been a problem to provide adequate strength transversely of the crankcase. The instant device not only provides three heavy transverse webs at 30, 31 and 32 for the main bearings, but it also provides for transverse connection between the side walls 24 and 26 of the crankcase below the level of the crank. In order to do this while at the same time providing access to the bearings and the cylinders, I provide integrally a generally cylindrical web 35 to which the side walls 24 and 26 are tangent and which is integral with the buttresses 33, 34 and 36 of webs 30, 31 and 32 as clearly shown in Figs. 1, 2 and 4. In addition, the side walls 24 and 26 are connected by a generally horizontal web 40 which is not only connected integrally with the side walls, but is integrally connected by transverse vertical webs 41 and 42 with the cylindrical web 35.

Registering circular openings 43 and 44 are formed in the cylindrical web 35 and the horizontal web 40 directly beneath the center crankshaft bearing hereinafter referred to, and semi-circular openings of like nature are provided at 45 and 46 in web 35 and at 50 and 51 in web 40 giving access to the front and rear main bearings respectively. Through these same openings pistons and connecting rods may be manipulated.

One of the bearing caps 53 for the crankshaft bearings is separately illustrated in Fig. 5. It is bolted from below to the cylinder block in an order to facilitate the machining of the seat which receives it. The seat is faced from below through the registering holes in the reinforcing webs as above described. It is a relatively simple matter to machine with accuracy a cylindrical hole. The ends of each of the bearings caps 53 have cylindrical surfaces 54 complementary to the cylindrically machined holes 55 in which they are received as clearly shown in Figs. 4 and 5. The bearing surfaces are, as usual, provided with semi-tubular bushings 60 and 61. The surfaces which receive these can be machined with accuracy and relative ease from either end of the block.

The bottom of the crankcase is closed by a removable pan 62 which acts as a sump for the lubricating oil and is drained by means of plug 63. This entire pan may be well below the level of the crankcase proper, all portions of the crankcase walls and reinforcing webs being a unitary part of the block casting. Contributing to the strength as well as to the temperature equalization of the crankcase are the jacket walls 64, 65 which are spaced outwardly from the crankcase walls 24, 26 and are integral with them.

Coolant circulates through the jacket spaces 66, 67 of the crankcase as well as through the various jacket passages of the cylinders, all of which are identified by reference character 70. A drain cock at 71 permits draining condensate and/or oil from the air passages. A similar cock 72 permits the draining of all of the coolant when desired. The jacket spaces extend into the cylinder heads 73 removably connected with the block. These heads are formed to provide ignition chambers 74 into which fuel is delivered with properly controlled timing through the nozzles 75 from the fuel pump 76.

The respective cylinders are provided in the usual manner with pistons 80 having connecting rods 25 attaching them to the cranks of the crankshaft 23. An oil passage 82 extends lengthwise throughout the crankshaft 23 and from it suitable ducts 83 open laterally into the connecting rod bearings for the delivery of oil through the hollow connecting rods 25 to the pistons in the manner disclosed in the companion application of Karde, Paquette and Putz entitled Connecting Rods and Piston Assembly, filed May 8, 1957, Serial No. 657,866, now Patent 2,926,975, March 1, 1960.

Air required for combustion is supplied under pressure by a blower 85 hereinafter to be described in more detail. It is delivered through manifolds 84 and 86 into the cylinders through the air inlet ports 87 which are controlled by the movement of the pistons 80. Exhaust of gases from the cylinders is effected subject to the control of rotary valves 90 and in part subject to the control of exhaust ports 91, 92, 93 by the pistons. Exhaust gases passing the rotary valves 90 are delivered into the exhaust manifolds 94 at opposite sides of the engine.

The blower 85 is of the type conventionally known as a Root blower having interacting rotors 95 and 96 in a blower chamber 97, having wall portions 98, 99 concentric with the axes upon which the respective rotors rotate. It would be very expensive and difficult to machine the block and cover 118 to receive the blower if its external contours were those of the walls 98 and 99 outlining the chamber 97. Accordingly, these wall portions 98, 99 are cast in the manner shown in Fig. 2 and Fig. 3 and bolted between head discs 100 and 101. A central land 102 on the side wall portions 98, 99 corresponds in circular radius.

The portions of the casing which lie at the least radius are spanned longitudinally of the casing by channels comprising webs 102, 103, 104. Spaced peripherally of the casing from these webs are webs 105, 106 respectively. From these, arcuate webs 107 extend peripherally in the radius of the discs 100, 101, 103.

Between the web 103 and web 105 is an inlet port 110 and between web 104 and 106 is an inlet port 111. These ports receive air through the passages 112, 113 from the air cleaners 114. At the other side of the blower this air is discharged under compression through the port 116 whence it passes through manifolds 84, 86 into the inlet ports 87 of the respective cylinders when these are uncovered by the respective pistons.

It will be observed that the portions of the blower unit 85 which seat in the block are all cylindrically machined so that a cylindrically bored and finished hole in the block and the blower cover member 118 will receive these with a tight fit. The bearing engagement of the blower in the block 20 and cover 118 is indicated by the circle 117 in Fig. 2.

Figures 7, 8, 9:
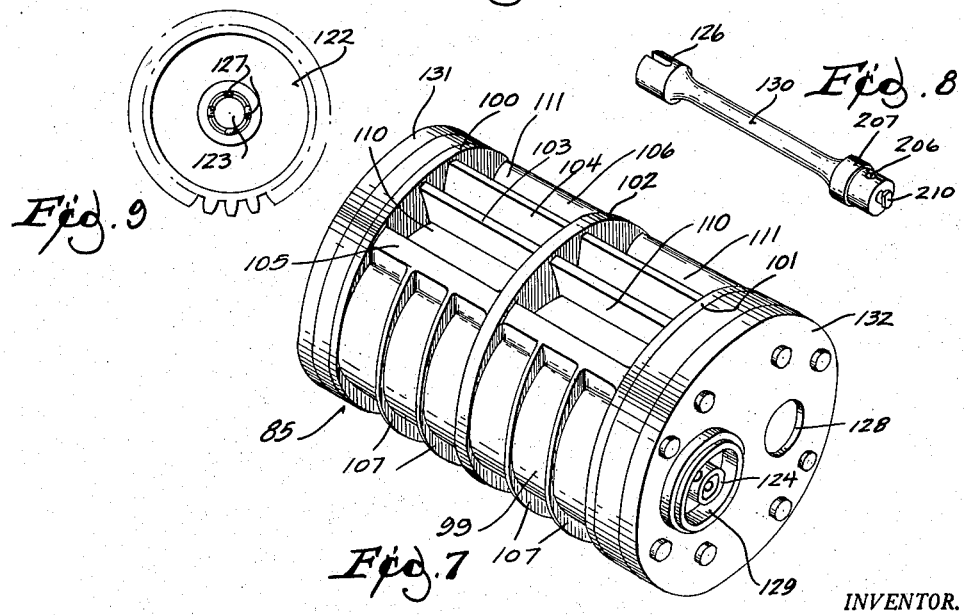
Fig. 7 is a view in perspective of the blower unit as it appears separately from the cylinder block casting in which it is housed.
Fig. 8 is a view in perspective of the driving quill which actuates the drive shaft of the blower.
Fig. 9 is a view in end elevation of the driving gear at the end of the blower shaft.

The respective rotors 95, 96 of the blower are suitably mounted from the heads 100, 101 in bearings of appropriate form as shown in Fig. 6. The shaft 120 of rotor 96 is connected by gear 121 with a gear 122 on the shaft 123 of rotor 95 to assure that the rotors will operate in timed unison and mesh properly as they rotate. In order to time the device in the first instance, the rotors are set in the proper relationship indicated in Fig. 2 while the gears 121, 122 are still loose on the shafts 120, 123. When the gears are meshed and the rotors are in exactly the right relationship, the gears are welded to their respective shafts as indicated at 127 (Fig. 9). This can be done prior to application of the end wall 132 best shown in Figs. 6 and 7.

The gear 121 carries a fitting 124 which is bolted to it and provided with a crosspin 125 to receive the bifurcated end 126 of the driving quill 130 which is separately illustrated in Fig. 8 and is mounted in a manner hereinafter described. Supplemental heads 131, 132 are applied over the head discs 100, 101 to enclose the bearings and the gears. The assembly is bolted together as best shown in Fig. 7 and inserted in the block and removed therefrom as a unit. When in place, its inlet ports register with the air supply passages, and its lubrication duct 133 registers with the lubricant supply duct hereinafter to be described, thereby providing for the lubrication of the bearings.

An end section or casting generically designated by reference character 140 is prefabricated as a unit and connected to the cylinder and crankcase block 20 as shown in Fig. 1. An elevation of the inner face of the end section is shown in Fig. 3. The pan 62 is bolted to the bottom of the end section 140 which, when in place, provides the rearward end of the engine. The end section houses passages for lubricant; a vent passage from the crankcase; an oil filter case; gear trains, and an oil pump.

The oil pump 141 is a gear pump comprising segments 142 and 143, both of which have generally cylindrical contours to fit into the opening 147 (Fig. 3) which is machined to cylindrical form for the same reason that the blower housing 85 is made to fit a cylindrically machined hole, despite the fact that the case normally enclosing the rotors in a blower of this kind is not of cylindrical contour. So in the case of the pump 141, the driving and driven gears 148 and 145 are mounted in a chamber which is vertically elongated and provided between the sections 142 and 143. The casing part 142 has an integral inlet conduit 146 which extends below the level of oil in sump 62 and has a lateral extension 150 to provide the inlet side of the pump as shown in Fig. 3.

Formed in section 143 of the pump casing is an outlet passage 151 which, when the pump is properly mounted, communicates with a passage 152 leading upwardly through the end section 140 of the engine to an elevated chamber 153 for the oil filter 154. A removable cap 155 permits the filter to be removed and replaced.

Oil entering the outside of the filter leaves it axially through the discharge duct 156 provided in the end section 140 of the engine. This passage 156 communicates as shown in Figs. 1 and 3 with a passage 160 extending forwardly above and parallel with the crankshaft and communicating with passage 161 extending through the entire engine block to the forward end thereof, where it connects with another passage 162 formed in a stud 163 which is supported in part by a front end section 165 applied to the front of the block 20 as best shown in Fig. 1. This stud 163 carries a sprocket 164 chain-driven from crankshaft 23 and connected with other sprockets 166 for driving the rotary exhaust valves 90 already described.

The lubricant continues from duct 162 to a passage 170 leading downwardly to a manifold ring 171 which surrounds the forward end of the crankshaft as shown in Fig. 1 and in the enlarged detail in Fig. 12. The annular passage 172 in the manifold ring maintains permanent communication with the radial ports 173 in the crankshaft 23. Oil entering the bore 174 in the crankshaft is held in close proximity to the outer surface of the crankshaft by means of the tubular plug 175 which has a land at 176 fitted to the bore 174 to prevent the oil from moving rearwardly from the ports 173. Confined by the plug 175, the oil moves forwardly until it issues from the crankshaft into the interior of the V-belt pulley 180 from which the cooling fan 181 is driven by means of belts 182.

The plug 175 has a radial flange 183 anchored by bolts 184 to the end of crankshaft 23 but spaced therefrom by the bosses through which the bolts extend as best shown in Fig. 12. The oil passes outwardly between the forward wall of pulley 180 and flange 183 to the outer periphery of chamber 185 within the pulley. Centrifugal force tends to keep grit and other solids in the outer periphery of this chamber 185 while the oil, confined to the chamber by the counterweight and cover 186, flows centrally to escape from the chamber through the bore 190 through the center of the tubular plug 175, whereby the oil is guided to the crankshaft duct 82 leading to the main bearings and connecting rod bearings of the crankshaft. Desirably the cranks 187 are bored with large holes closed at their ends by the heads of a sleeve 188 so that the oil is confined to the annular space around this sleeve, from which it issues to the connecting rod bearings through the ducts 189 (Fig. 16).

As explained in the patent above identified, much of the oil finds its way from the connecting rod bearings through the tubular connecting rods 25 to the mushroom head bearings which replace the wristpin bearings as means of mounting the pistons to the connecting rods. All oil leaking from the crankshaft and connecting rod bearings returns to the sump for recirculation.

Some of the oil delivered by the pump 141 through the filter 154 does not follow this course. As shown in Fig. 1, a branch passage 192 opens from the filter return duct 156 and extends upwardly at the rear of the engine through the rear section 140. A branch duct 193 opens from passage 192 into an annular chamber 194 which supplies lubrication to the hub 196 of the gear 200 which drives the blower 85. It will be observed that the hub 196 is tubular and that its external periphery constitutes its bearing surface (Fig. 6). The retaining ring 201 screwed to the inner face of the end section 140 as clearly shown in Fig. 6 holds gear 200 against axial displacement from its bearing in bushing 195.

A hole 203 is provided at the face of the end section casting 140 and through this the end of the hub 196 projects. Its projecting end has a diametrical hole at 204 to receive a pin 205 which passes through the registering hole 206 in the end of quill 130. The land 207 of the quill is fitted snugly to the interior of the hub so that when the quill is in place, its outer end is constrained to rotate in unison with the hub. By withdrawing the pin 205, the quill can be removed, using the shouldered lug 210 projecting from its end to receive a suitable drawing tool.

A packed closure 211 covers the projecting end of the quill and encloses the pin 205 which couples the quill to the driving gear. The quill provides a suitable degree of flexibility between the gear and the blower rotor shaft 120. The small diameter of the quill in relation to its length and its torsional resilience absorbs a limited amount of torque sufficient to prevent shock to or from the high speed blower rotor in the starting and stopping of the engine.

At its upper end, the oil duct 192 (Fig. 1) discharges into chamber 208 in which is exposed the end of a tubular stud 209 which is a part of a bearing plug 218 upon which the idler gear 220 is mounted. This gear meshes with the blower driving gear 200 and transmits motion to a gear 221 at the top of the engine. This gear is shown in enlarged detail in Fig. 10 and Fig. 11. It is mounted on shaft 223 which drives the fuel pump 76. It carries a radially vaned rotor 225 which centrifugally extracts oil entrained in gases vented from the crankcase through passage 226. The oil is picked up in the relatively stationary foraminous annular channel 230 and returned through passage 231 (Figs. 10, 11 and 3) to the crankcase. The air thus freed of entrained oil is discharged through the annular chamber 232 to the vent pipe 233.

In practice, I provide an extension quill 234 attached to the rear end of the oil pump shaft 223 to drive a tachometer, the end of the quill being exposed through the threaded coupling sleeve 235 as shown in Fig. 10.

The separately prefabricated end section 140 of the engine is illustrated in Figs. 1 and 3. It cooperates with the cylinder block casting in some instances, and functions independently in other instances to provide bearing supports and enclosures for the various gears of the train illustrated in these views.

The driving gear 240 is mounted directly on the crankshaft 23. It is counterbored to receive the full diameter of the crankshaft, the reduced extremity 241 of the crankshaft extending through the hub of gear 240 to receive the hub 242 of the flywheel 243. Bolts 244 hold the flywheel to the shaft. A seal at 245 prevents oil leaks between the hub of the flywheel and the outer wall 246 of the end section 140.

Meshing with gear 240 below the crankshaft is the gear 250 which is mounted on the oil pump shaft 251 which carries pump gear 148. The pump driving gear 250 is merely housed within, rather than mounted upon, the end section 140.

In general, the end section 140 is hollow, having a forward wall 252 within which most of the gears are confined. However, this wall has an opening at 257 into which the gears may be inserted to be manipulated into place and supported by the removable bearing plugs such as those shown at 253 and 218 has hereinafter described. A bearing plug 253 mounted in this wall and having the oil duct 160 extending through it in registry with duct 161 of the engine block supports the hub of an idler gear 255 meshing with the crankshaft gear 240. The bearing surfaces of plug 253 and the hub of gear 255 are conveniently lubricated by one or more ducts 256 opening radially through the plug as shown in Fig. 1.

The idler 255 meshes with and drives the gear 200 already described. This gear has its hub 196 mounted on a boss 260 formed on the prefabricated end section 140. It is mounted through an opening in the end section 140 subsequently closed by a separately formed plate 201. It is the gear 200 which drives the blower through the quill 130 as already described.

Another bearing plug at 218 mounted in the prefabricated forward wall 252 of the end section 140 provides bearing support for the idler gear 220. The hub of this gear is lubricated by oil reaching it through the ducts 265 (Fig. 1). As already explained, the idler 220 drives the gear 221 to operate the fuel pump 76.

The end section 140 attached to the engine block has openings such as those shown at 266, 267 and 268 for venting vapor from the crankcase through passage 226 to the centrifugal separator rotor 225 already described.

The rear bearings for the rotary valve shafts 270 are desirably provided in this end wall section 140 and lubricated by oil flowing through ducts 271 (Fig. 3) from troughs 272 in the side walls of the gear cavity. Excess oil in the gear cavity of the end section 140 returns to the crankcase through the opening 257 in the forward wall 252 of the hollow end section. Excess oil from the valve shaft bearings is returned to ducts 273 to the return flow space from which the ports 268 open at the bottom of the end section.

Cooling water heated in the engine jacket is returned to the conventional radiator (not shown) through pipe 275 (Fig. 1) and returned from the radiator through pipe 276. This latter pipe opens through the front closure 277 of a pump casing 280 which is neither circular nor volute but has somewhat the form of an elongated ellipse with the impeller 281 located at its widest point. An annular flange 282 guides the water axially to the impeller and provides a chamber 283 through which water from the thermostatically controlled bypass flows through duct 287 to enter the pump without cavitation. The impeller is driven by chain 284 from a sprocket 285 on the crankshaft. Except for its upper and lower peripheral edges, the water is not confined in any way but is discharged laterally in both directions through the passages 286, 287 leading to the ports 288 through which it enters the jackets. Notwithstanding that the impeller is in a generally open chamber extending in both directions toward the jacket-communicating ports 288, it operates very efficiently to deliver water under considerable pressure to said ports.

The pump housing 280 comprises a separately fabricated insert in the front section 165 attached to the front of the block casting. The impeller shaft 290 and chain 284 are exposed to crankcase oil and tend to elevate that oil within the front section 165 for the lubrication of the other chains and sprockets above described. The forward bearing for the impeller shaft 290 is lubricated through an oil duct 291.

I claim:

1. An engine construction comprising the combination with angularly divergent cylinders, of a crankcase integral with said cylinder and upon which the cylinders are mounted, and a crankshaft provided with bearings in the crankcase, the crankcase having integral spaced side walls provided with bearing supports and with independent means integrally connected the side walls of the crankcase with each other below the crankshaft.

2. As a new article of manufacture, a one piece casting comprising angularly disposed cylinders, and a crankcase having side walls with crankshaft bearing supports and with integral web portions extending transversely and longitudinally and in addition to said supports and spaced sufficiently below said cylinders to accommodate a crankshaft between the cylinders and said web portions.

3. As a new article of manufacture, a one piece casting comprising angularly disposed cylinders, and a crankcase having side walls with integrally connecting web portions spaced sufficiently below said cylinders to accommodate a crankshaft between the cylinders and said web portions, web portions having apertures opening downwardly and offset from respective cylinders.

4. In an engine, the combination with divergent cylinders, of a crankcase comprising spaced side walls, transverse web means provided with bearing mounts, and additional web means spanning the crankcase below the bearing mounts and integral with the side walls and the transverse web means first mentioned, and provided with apertures opening downwardly and affording access from beneath to the said bearing mounts.

5. The device of claim 4 in further combination with bearing caps mounted in respective bearing mounts, the bearing mounts having surfaces engaged by said caps and so disposed as to be accessible through said apertures.

6. The device of claim 4 in which said additional web means comprise two webs at differing levels and both provided with the said apertures.

7. The device of claim 6 in which the webs at different levels have integral bracing webs providing a connection therebetween.

8. The device of claim 7 in which the integral bracing webs are disposed between apertures of the upper and lower additional web aforesaid, the upper of said additional webs being generally curvilinear in its extent between said walls.

9. In a multi-cylinder diesel engine, the combination with a crankshaft provided with axially spaced bearing portions, of an integral cylinder and crankcase casting having bearings with which the crankshaft bearing portions are engaged, the said casting comprising crankcase side walls spaced at opposite sides of the crankshaft and having an integral connecting wall spanning the crankcase at a level spaced beneath the crankshaft bearings, said connecting wall being provided with apertures registering with the respective bearings, the said bearings comprising removable caps attached to the casting aforesaid and accessible through the apertures.

10. In a diesel engine, the combination with a crankshaft provided with axially spaced bearing portions, of an integral cylinder and crankcase block comprising a casting having bearings with which the crankshaft bearing portions are engaged, the said block comprising crankcase side walls spaced at opposite sides of the crankshaft and having an integral connecting web spanning the crankcase beneath the crankshaft, said connecting web being provided with apertures registering with the respective bearings, the said bearings comprising removable caps attached to the casting aforesaid and accessible through the apertures, and an additional transverse web connecting said side walls below the level of the apertured web aforesaid, the first mentioned apertured web being generally curvilinear in cross section and the second mentioned web having apertures registering with those of the first mentioned apertured web, the two said apertured webs having flange means integrally cross connecting them between their registering apertures.

11. The device of claim 9 in which said block comprises angularly divergent cylinders and an end wall extending between the cylinders and having a surface of generally circular contour, a pump providing fluid required for engine operation and having interacting rotors spaced on parallel axes and a casing housing said rotors and disposed between said cylinders and provided with portions of generally circular contour fitting the surfaces of said block and secured therein, one of said rotors having driven connection with said crankshaft.

12. In a multi-cylinder diesel engine, the combination with a crankshaft provided with axially spaced bearing portions, of an integral cylinder and crankcase casting having bearings with which the crankshaft bearing portions are engaged, the said casting comprising crankcase side walls spaceds at opposite sides of the crankshaft and having an integral connecting wall spanning the crankcase at a level spaced beneath the crankshaft bearings, said connecting wall provided with apertures registering with the respective bearings, the said bearings comprising removable caps attached to the casting aforesaid and accessible through the apertures, said crankcase side walls and cylinders being provided with communicating jackets, side engine including means for circulating a coolant through said jackets for the equalization of temperatures in said crankcase and cylinders.

13. In a two cycle diesel engine, the combination with a crankshaft, pistons and connecting rods in operative assembly, of a casting integrally providing divergent cylinders and a crankcase, said cylinders and crankcase having communicating jacket spaces in said casting, means mounting the crankshaft in the crankcase, and means for causing the flow of coolant through the jacket spaces of said casting and comprising an elongated pump that is disposed transversely of the crankcase and having discharge ports at opposite sides of the crankcase communicating with said jacket spaces, a rotor mounted centrally of the elongated pump casing and having laterally opposite peripheral portions exposed for delivery toward said ports, the pump casing having a central inlet opposite the rotor and the rotor having a driving connection.

14. The device of claim 13 in which the crankcase portion of said casting includes a generally cylindrical web connecting the side walls of the crankcase beneath the crankshaft, means in the crankcase providing bearings for the crankshaft and opposite which the generally cylindrical web is provided with openings, the said crankcase further comprising a second transverse web below the generally cylindrical web and integral with the side walls of the crankcase and also having integral upright transverse webs connecting said lower transverse web with said generally cylindrical transverse web, said last mentioned webs having substantially registering ports opposite the bearing means and between which the upright transverse webs are disposed.

15. In a two cycle diesel engine, the combination with a crankshaft, pistons and connecting rods in operative assembly, of a casting integrally providing divergent cylinders, and a crankcase provided with side walls spaced at opposite sides of the crankshaft, the said casting having means providing bearings for the crankshaft and in which the crankshaft is mounted, and the side walls having transverse generally horizontal and transverse webs integrally connected with the side walls and with each other and having apertures below the respective bearings and through which the respective bearings are accessible, the said casting having at least one terminal facing casting attached to its end, a supercharger pump disposed in the angle between the cylinders, and a driving connection to the pump enclosed by said end wall.

16. The device of claim 15 in which said first mentioned casting comprises a bore having a finished surface of substantially circular cross section, said pump having a complementary surface of generally circular cross section in bearing engagement with the first mentioned surface.

17. The device of claim 15 in which the casting first mentioned is provided with cylinder and crankcase jackets having coolant cavities in operative communication, and means for circulating coolant through said cavities.

18. The device of claim 17 in which said means comprises a coolant pump below the crankshaft and in operative driven connection therewith, said coolant pump comprising a central rotor and a casing having an inlet opening centrally opposite said rotor, said casing being open laterally of said rotor to opposite sides of the crankcase and having communication at opposite sides of the crankcase with jacket spaces at opposite sides of said casting first mentioned.

19. In a diesel engine, the combination with a crankshaft, pistons and connecting rods in operative assembly, of a primary casting integrally providing cylinders angularly related in a V and in which the pistons are disposed and crankcase side walls embracing the crankshaft and provided with bearing means in which the crankshaft is mounted, reinforcing webs integrally connecting the side walls beneath the crankshaft and ported opposite said bearing means, a removable closure attached to the primary casting and enclosing the crankcase portion thereof below the ports of said web, a secondary casting comprising a finishing plate connecting to an end of the primary casting and connected to the rear sides of cylinders across said V, whereby to re-enforce said primary casting, the secondary casting comprising a drive housing, an oil pump having driving connections from the crankshaft disposed in the drive housing, an air pump having driving connections from the crankshaft disposed in the drive housing, a fuel pump having driving connections from the driveshaft enclosed in the drive housing, a lubricating system including a centrifugal oil pump having a rotor operatively connected in said drive housing to the crankshaft, and a crankcase vent including a centrifugal air cleaner having driven connection through said housing with the crankshaft and having inlet and outlet ports respectively communicating with the crankcase and with the atmosphere.

20. The combination with an engine cylinder block casting having a port provided with a finished surface of generally circular contour, of a pump required for engine operation and comprising intermeshing rotors and a casing having an externally finished surface of generally circular contour complementary to the surface first mentioned, and means mounting said pump in said casting with the respective complementary surfaces in engagement.

References Cited in the file of this patent
UNITED STATES PATENTS

| | | |
|---|---|---|
| 1,366,149 | Applin | Jan. 18, 1921 |
| 1,761,872 | Chorlton | Jan. 3, 1930 |
| 1,970,552 | Berge | Aug. 21, 1934 |
| 1,979,693 | Lindenberger | Nov. 6, 1934 |
| 2,018,612 | Good et al. | Oct. 22, 1935 |
| 2,079,357 | Morris et al. | May 4, 1937 |
| 2,099,852 | Knudsen | Nov. 23, 1937 |
| 2,113,077 | Buchi | Apr. 5, 1938 |
| 2,151,423 | Ford | Mar. 21, 1939 |
| 2,249,165 | Owner | July 15, 1941 |
| 2,305,012 | Kinnucan | Dec. 15, 1942 |
| 2,394,675 | Fawick | Feb. 12, 1946 |
| 2,429,105 | Paxman | Oct. 14, 1947 |
| 2,436,729 | Paxman | Feb. 24, 1948 |
| 2,524,597 | Kline et al. | Oct. 3, 1950 |
| 2,738,779 | Christianson et al. | Mar. 20, 1956 |
| 2,758,672 | Anderson et al. | Aug. 14, 1956 |
| 2,781,750 | Chayne | Feb. 19, 1957 |
| 2,782,775 | Leach | Feb. 26, 1957 |
| 2,844,133 | Thompson | July 22, 1958 |